US006841046B2

United States Patent
Puthawala et al.

(10) Patent No.: US 6,841,046 B2
(45) Date of Patent: Jan. 11, 2005

(54) SYSTEM FOR SUPPLYING A GENERATOR WITH HYDROGEN

(75) Inventors: Anwer Puthawala, Buckenhof (DE); Peter Schönfeld, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 10/270,471

(22) Filed: Oct. 15, 2002

(65) Prior Publication Data

US 2003/0079985 A1 May 1, 2003

(30) Foreign Application Priority Data

Oct. 15, 2001 (EP) .............................................. 01124602

(51) Int. Cl.[7] .............................. C25B 9/00; C25B 1/02; C25B 11/04
(52) U.S. Cl. ................................ 204/229.8; 204/230.2; 204/258; 204/262; 204/265; 204/266; 204/292; 204/256
(58) Field of Search ................................ 204/265–266, 204/256, 258, 292, 277, 278

(56) References Cited

U.S. PATENT DOCUMENTS

| 4,100,051 A | * 7/1978 | Kilby et al. | 204/266 |
| 5,632,870 A | * 5/1997 | Kucherov | 204/241 |
| 6,076,568 A | 6/2000 | Rehm et al. | |

FOREIGN PATENT DOCUMENTS

| DE | 3105168 | 8/1982 |
| WO | 01/47053 | 6/2001 |

* cited by examiner

Primary Examiner—Donald R. Valentine
(74) Attorney, Agent, or Firm—Harness, Dickey & Pierce, P.L.C.

(57) ABSTRACT

A system is for supplying a generator with hydrogen, in particular a generator of a power generating plant. The system offers a high level of safety while at the same time making handling easy. The system includes a closed system cycle for carrying water and/or gas and a hydrogen feed line, branching off from the system cycle, for the generator. The system cycle includes an electrolysis unit designed as a membrane electrolyzer.

19 Claims, 1 Drawing Sheet

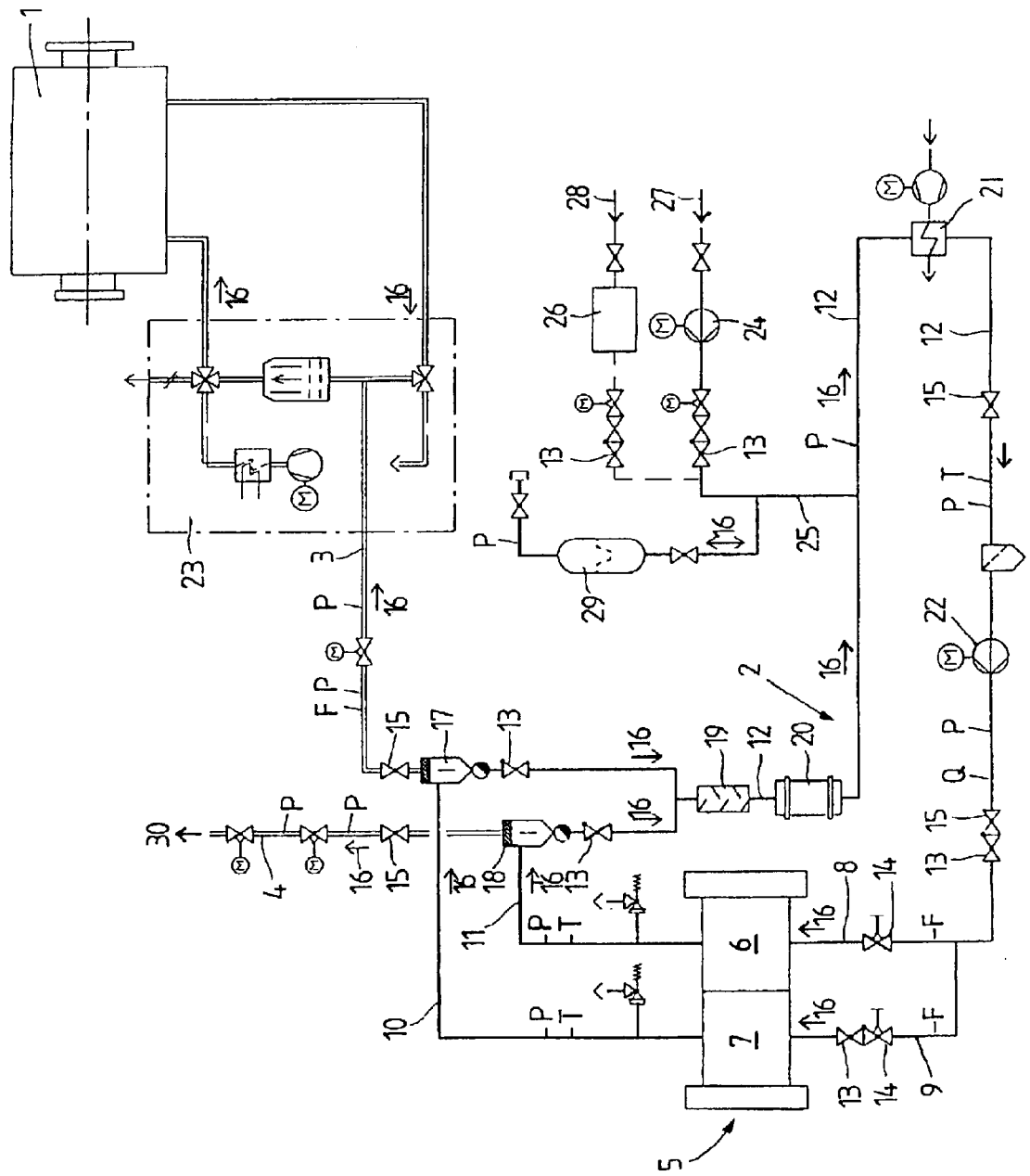

SYSTEM FOR SUPPLYING A GENERATOR WITH HYDROGEN

The present application hereby claims priority under 35 U.S.C. §119 on European patent publication number 01124602.2 filed Oct. 15, 2001, the entire contents of which are hereby incorporated herein by reference.

FIELD OF THE INVENTION

The invention generally relates to a system for supplying a generator with hydrogen. In particular, it relates to a generator of a power generating plant.

BACKGROUND OF THE INVENTION

Generators, in particular those of large power generating plants, for example with an output in excess of 50 MW, are cooled during operation to protect them from damage caused by overheating. Suitable preferably as the coolant for this purpose is hydrogen, which in comparison with air has a heat dissipating capacity 18 times higher. To increase the effect of the cooling still further, the hydrogen is brought to superatmospheric pressure in the generator and, depending on the type of generator to be cooled, is used at a pressure of, for example, 2.0 bar to 5.25 bar.

Constant leakages have the effect that the generator is always losing hydrogen. To be able to ensure satisfactory operation of the generator, this amount of leakage must be compensated according to requirements, for which reason corresponding amounts of hydrogen have to be fed to the generator from time to time. In this connection, it is known from the prior art to provide hydrogen in gas cylinders or storage tanks and feed it to the generator according to requirements via corresponding pipelines. If, owing to the site, it is not possible for gas to be delivered in cylinders or by road tankers, it is also known from the prior art to generate hydrogen on site by use of potassium hydroxide electrolyzers, store it in appropriate tanks and feed it to the generator via a pipeline system.

A disadvantage of the way described above of storing, distributing and feeding hydrogen to the generator is the fact that, if there is a loss of integrity or leakages, the formation of ignitable gas mixtures can occur, with the result that a fire or even an explosion cannot be ruled out. Furthermore, in particular in the case of improper or unintentionally negligent handling of the hydrogen storage tanks, there is a high risk of an accident, which is particularly pronounced when the storage tanks are changed.

It has been attempted in the past to minimize the disadvantages and risks associated with the formation of ignitable gas mixtures by the evaporation brought about by natural ventilation, i.e. by allowing air to pass through. However, a residual risk remains in any case. Added to this is the fact that the hazard entailed in changing spent hydrogen storage tanks is countered only by corresponding work regulations, which of course is highly unsatisfactory, since such measures do not reduce the hazard itself but merely prevent improper handling. However, measures of this kind which prescribe handling procedures are often elaborate and time-consuming to implement, with the not infrequent result in practice that they are deliberately avoided by the operating personnel to make handling easier and quicker. They are therefore not really suitable for reducing the hazard on a long-term basis.

SUMMARY OF THE INVENTION

It is an object of an embodiment of the present invention to propose a system for supplying a generator with hydrogen which offers a high level of safety while at the same time making handling easy.

To achieve this object, an embodiment of the invention proposes a system for supplying a generator with hydrogen, in particular a generator of a power generating plant, with a closed system cycle for carrying water and/or gas and a hydrogen feed line, branching off from the system cycle, for the generator, the system cycle having an electrolysis unit designed as a membrane electrolyzer.

The system according to an embodiment of the invention provides a generator hydrogen-supply system which has a closed-loop system cycle and produces only as much hydrogen as is required for feeding into the generator for cooling purposes. With the system according to an embodiment of the invention, it is ensured in an advantageous way that, if there is a loss of integrity or leakages, the formation of ignitable gas mixtures is effectively prevented, since the hydrogen kept in the system is restricted to the amount of hydrogen in the pipelines. This amount of hydrogen is not sufficient, however, to allow ignitable gas mixtures to form in the event of a leak.

The electrolysis unit which is integrated in the system cycle and is designed as a membrane electrolyzer is fed water, preferably demineralized water or correspondingly treated drinking water, which is then electrolyzed into hydrogen and oxygen. The hydrogen produced in this way is used for cooling the generator, whereas the oxygen is discharged into the atmosphere as a waste product and can be used for other purposes. By appropriate control of the supply of electric current to the electrolysis unit, the latter can be operated on the basis of the amount of hydrogen required by the generator. The electrolysis unit produces as the amount required only as much hydrogen as is actually needed by the generator. Overproduction of hydrogen can consequently be prevented in an advantageous way. With the system according to an embodiment of the invention, it is also no longer necessary to make hydrogen reserves available by means of corresponding storage tanks. Consequently, there is likewise no longer the need for spent hydrogen storage tanks to be changed.

In comparison with a conventional potassium hydroxide electrolyzer, the electrolysis unit designed according to an embodiment of the invention as a membrane electrolyzer has the advantage of not producing any waste. It is consequently not necessary, unlike in the case of a potassium hydroxide electrolyzer, to renew the potassium hydroxide solution at regular intervals. Rather, the system according to an embodiment of the invention can be operated for many years without any maintenance work on the electrolyzer, it simply being necessary to check it whenever routine major inspections of the overall plant are conducted. The use of dedicated gas cleaning installations is also no longer required, since no chemicals are used in the system according to an embodiment of the invention.

Moreover, the system according to an embodiment of the invention offers the advantage that it can be made very compact, so that it is possible for the system to be installed in close proximity to the generator, allowing the hydrogen-carrying pipelines to be kept as short as possible. In this way, the maximum amount of hydrogen available in the hydrogen-carrying pipelines is reduced to a minimum. Added to this is the fact that the pipeline connections of the hydrogen-carrying pipes of the system according to the invention do not have to be disconnected, as would be the case for example for the changing connection of hydrogen storage tanks. The hazard is consequently reduced to the smallest possible level.

The generator hydrogen-supply system according to an embodiment of the invention advantageously offers a high level of safety, since only the amount of hydrogen required by the generator is produced by the electrolysis unit integrated in the system cycle. The overproduction and intermediate storage of hydrogen, representing a potential hazard, can consequently be avoided in an advantageous way. With the system according to an embodiment of the invention, it is also no longer required for externally produced hydrogen to be introduced into the system by means of hydrogen storage tanks which have to be regularly exchanged. This not only prevents the hazard but also makes much easier handling possible, which is reflected not least in the possibility of reduced expenditure on personnel. Moreover, the system according to an embodiment of the invention requires less expenditure on maintenance and consequently the electrolysis unit has to be checked only as part of regularly occurring overall maintenance procedures.

According to a further feature of an embodiment of the invention, the electrolysis unit has a plurality of membrane electrolysis cells connected electrically in series. This type of configuration of the electrolysis unit offers advantages in particular with regard to overall size, since the configuration of membrane electrolysis cells permits a compact type of construction. In particular in comparison with a conventional potassium hydroxide electrolyzer, for which generally a separate building with dimensions of, for example, 20 m×10 m×4 m is necessary, the electrolysis unit used according to the invention offers such a compact construction, for example of 1.2 m×1.2 m×2 m, that it can be set up in close proximity to the generator. This allows the hydrogen-carrying pipelines which lead from the electrolysis unit to the generator to be restricted to a minimum length, which has advantageous effects with regard to safety aspects to the extent that the amount of hydrogen present in the system is minimal.

According to a further feature of an embodiment of the invention, it is provided that each membrane electrolysis cell is provided on either side with a contact layer serving as an electrode, the contact layer intended as the cathode preferably being formed from platinum and the contact layer intended as the anode preferably being formed from iridium. Forming the membrane electrolysis cell in this way not only permits a high degree of conversion but also ensures long-term durability of the electrolysis unit, which advantageously results in reduced expenditure on maintenance. What is more, particularly low expenditure on maintenance and repair is ensured by the fact that only pretreated water, i.e. in the form of demineralized water, is fed to the system and consequently to the electrolysis unit.

According to a further feature of an embodiment of the invention, the contact layers intended as the cathode and the contact layers intended as the anode are respectively connected on the input side and output side to a common feed line and to a common discharge line. The water-carrying pipeline branches upstream of the electrolysis unit in the direction of flow into a feed line for the cathode and into a feed line for the anode. In both pipelines there are advantageously flow measuring points and setting valves. Downstream of the electrolysis unit in the direction of flow there are on the cathode side and on the anode side corresponding discharge lines. To prevent hydrogen from flowing back into the anode side of the electrolyzer in the event of a wrong connection being made, according to a further proposal of an embodiment of the invention there is a corresponding non-return valve in the pipeline on the cathode side.

According to a further feature of an embodiment of the invention, the discharge line on the output side of the contact layers intended as the cathode is connected to a water-hydrogen separator and the discharge line on the output side of the contact layers intended as the anode is connected to a water-oxygen separator. The hydrogen separated in the water-hydrogen separator is fed to the generator pressure-dependently via a preferably pressure-regulating valve. This can take place by a gas drying installation possibly present at the generator. The oxygen separated in the water-oxygen separator is not required any longer in the system and can be discharged to the ambient air via an interposed pressure-regulating valve. Alternatively, the oxygen generated by the electrolysis unit may also be fed to an exhaust gas system, which treats or stores the oxygen for some other use.

According to a further feature of an embodiment of the invention, it is provided that the water-hydrogen separator and the water-oxygen separator are connected via a static mixer to a common catalyzer. This arrangement achieves the effect that the water separated in the two gas separators is collected and fed via a static mixer to a catalyzer, in which the residual gases in the water are recombined to form water. The gas-free water can then be fed again to the electrolyzer via a circulating pump. A closed system cycle is consequently realized in an advantageous way.

According to a further feature of an embodiment of the invention, a heat exchanger is arranged downstream of the catalyzer in the direction of flow. In this case, a feed line for the feeding of water is preferably provided in the section between the catalyzer and the heat exchanger. Since a small amount of water is constantly being used up in the electrolyzer, it is necessary to feed water, preferably demineralized water, to the system cycle. To prevent temperature-related pressure fluctuations, a heat exchanger is advantageously provided, arranged downstream both of the catalyzer and of the connection point of the feed line for the feeding of water, considered in the direction of flow. In the event that demineralized water is not available, drinking water must be converted into demineralized water and fed pressure-dependently. To avoid pressure fluctuations, there may be provided, moreover, an expansion tank, which is installed upstream of the heat exchanger in the direction of flow.

As already stated above, a major advantage of the system according to an embodiment of the invention is that the electrolysis unit does not produce hydrogen in reserve but instead provides hydrogen only in an amount required to be fed to the generator for appropriate cooling of it. This is achieved by corresponding control of the supply of electric current to the electrolysis unit. This is based on the principle that the higher the amount of current supplied, the greater the amount of hydrogen produced. It is correspondingly the case that the amount of hydrogen produced is reduced as soon as the supply of current to the electrolysis unit is reduced.

According to a further feature of an embodiment of the invention, it is provided in this connection that the system is characterized by a control device which controls the amount of current supplied to the electrolysis unit on the basis of the amount of hydrogen prepared by the electrolysis unit, with a measuring device being provided, measuring the amount of hydrogen fed to the generator and emitting a corresponding signal, and with a comparison circuit being provided, comparing the measuring signal with a predeterminable setpoint signal and, if they do not match, correspondingly raising or lowering the supply of current to the electrolysis unit. It is consequently decisive to compare the amount of hydrogen actually fed to the generator with that amount of hydrogen which would have to be fed to the generator to maintain a certain operating temperature. If a difference is obtained here as the result of a comparison of the measured actual amount of hydrogen with the predeterminable setpoint amount of hydrogen, the production of hydrogen in the electrolysis unit must be correspondingly changed. In the event that the actual amount remains below the setpoint amount, hydrogen production must be correspondingly boosted; in the converse case, that is if the actual amount of hydrogen exceeds the predetermined setpoint amount, the production of hydrogen by the electrolysis unit must be correspondingly cut back. This is controlled by use of the supply of current to the electrolysis unit, an increase in the supply of current being accompanied by an increase in the hydrogen production and, conversely, a reduction in hydrogen production being achieved by a decrease in the supply of current.

BRIEF DESCRIPTION OF THE DRAWINGS

Further advantages and features of the invention emerge from the description on the basis of the FIGURE, wherein:

The FIGURE shows, in a schematic representation, an overview of the system according to an embodiment of the invention.

DETAILED DESCRIPTION OF THE PREFERRED EMBODIMENTS

To supply a generator 1 with hydrogen serving as a cooling medium, the system cycle 2 according to an embodiment of the invention is provided. The system cycle 2 has an electrolysis unit 5, designed as a membrane electrolyzer, with correspondingly designed membrane electrolysis cells forming the anode 6 and the cathode 7. Further component parts of the system cycle 2 are a water-hydrogen separator 17, a water-oxygen separator 18, a static mixer 19 and a catalyzer 20 arranged downstream of the mixer 19 in the direction of flow 16. Furthermore, a heat exchanger 21 and a circulating pump 22 are provided. All the component parts of the system according to an embodiment of the invention are connected to one another via pipelines 12 to form a closed cycle. For constant monitoring of the water and/or gas carried in the system cycle 2, pressure measurements P, temperature measurements T, flow measurements F and conductivity measurements Q are carried out at different points of the system cycle 2, for which purpose appropriate sensors are installed in the system cycle 2. Furthermore, the system cycle has flow-regulating valves, the non-return valves 13, setting valves 14 and flow valves 15.

To supply the generator 1 with hydrogen, water, preferably demineralized water, is fed to the electrolysis unit 5 in the direction of flow 16. On the feed side, two different feed lines 8 and 9 are provided for this purpose, obtained by a branching of the pipeline 12. The feed line 8 is connected here to the anode 6 and the feed line 9 is connected here to the cathode 7. By applying current to the electrolysis unit, for example by a current generator not represented in the FIGURE, the water with which the electrolysis unit 5 is filled is electrolyzed to form hydrogen and oxygen. Hydrogen forms on the cathode 7 and is fed via the cathode discharge line 10 to the water-hydrogen separator 17. In a corresponding way, oxygen forms on the anode 6 and is fed via the anode discharge line 11 to the water-oxygen separator 18. Connected to the water-oxygen separator 18 is the oxygen discharge line 4, via which the oxygen is fed to an exhaust gas system. The oxygen may either be discharged to the surrounding atmosphere or be treated or stored appropriately for some further use. Connected to the water-hydrogen separator 17 is the hydrogen feed line 3, which feeds the required hydrogen to the generator 1. Preferably provided between the water-hydrogen separator 17 and the generator 1 in the direction of flow 16 is a gas dryer 23. Gas dryers are known per se from the prior art and therefore need not be discussed any further at this point with regard to their technical configuration.

The water separated in the two gas separators 17 and 18 is fed to a catalyzer 20 via a static mixer 19. The residual gases in the water are recombined into water in the catalyzer 20. The gas-free water is then fed back to the electrolysis unit 5 via a heat exchanger 21 and via a circulating pump 22.

Since a small amount of water is constantly being used up in the electrolysis unit 5, it is necessary to feed a corresponding amount of water to the system cycle 2. This takes place via the feed line 25, which is connected to the system cycle 2 in the section between the catalyzer 20 and the heat exchanger 21. The system cycle 2 is preferably fed demineralized water 27 via a pressure boosting pump 24. In the event that demineralized water is not available, it is also possible as an alternative to feed drinking water 28 which is converted into demineralized water by corresponding water treatment 26 and fed to the system cycle 2 via the feed line 25. To avoid pressure fluctuations, there is provided, moreover, an expansion tank 29, which is likewise connected to the feed line 25. It goes without saying that there are alternative connection possibilities.

The system according to an embodiment of the invention advantageously proposes a closed system cycle 2, the electrolysis unit 5 integrated into the system cycle 2 producing hydrogen according to requirement. The hydrogen is firstly fed to the generator 1 via the cathode discharge line 10 and the water-hydrogen separator 17 via the hydrogen feed line 3. In this case, the amount of hydrogen produced can be adapted quickly and precisely to the hydrogen requirement of the generator by way of simple current control. Moreover, a high purity of the hydrogen of up to 99.9% is advantageously achieved by the recombination of the residual gases in the water by the catalyzer 20.

List of Designations
1 generator
2 system cycle
3 hydrogen feed line
4 oxygen discharge line
5 electrolysis unit
6 anode
7 cathode
8 anode feed line
9 cathode feed line
10 cathode discharge line
11 anode discharge line
12 pipeline
13 non-return valve
14 setting valve
15 flow valve
16 direction of flow
17 water-hydrogen separator
18 water-oxygen separator
19 mixer
20 catalyzer
21 heat exchanger
22 circulating pump
23 gas dryer
24 pressure boosting pump
25 feed line
26 water treatment
27 demineralized water feed 28 drinking water feed
29 expansion tank
30 exhaust gas system
F flow measurement
P pressure measurement
T temperature measurement
Q conductivity measurement The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for supplying a generator with hydrogen comprising:
    a closed system cycle for carrying at least one of water and gas; and
    a hydrogen feed line, branching off from the system cycle, for the generator, wherein the system cycle includes an electrolysis unit designed as a membrane electrolyzer, wherein the electrolysis unit includes a plurality of membrane electrolysis cells connected electrically in series, and wherein each membrane electrolysis cell is provided, on either side, with a contact layer serving as an electrode, the contact layer used as a cathode being formed from platinum and the contact layer used an anode being formed from iridium.

2. The system as claimed in claim 1, wherein oxygen generated by the electrolysis unit is feedable to an exhaust gas system.

3. The system as claimed claim 1, wherein the system cycle includes a heat exchanger, arranged downstream of a catalyzer in the direction of flow.

4. The system as claimed in claim 1, wherein the contact layers used as the cathode and the contact layers used as the anode are respectively connected on an input side and an output side to a common feed line and to a common discharge line.

5. The system as claimed in claim 4, wherein the feed line on the input side for the cathode includes a non-return valve.

6. The system as claimed in claim 1, wherein the contact layers used as the cathode and the contact layers used as the anode are respectively connected on an input side and an output side to a common feed line and to a common discharge line.

7. The system as claimed in claim 6, wherein the feed line on the input side for the cathode includes a non-return valve.

8. The system as claimed in claim 6, wherein the discharge line on the output side of the cathode is connected to a water-hydrogen separator and the discharge line on the output side of the anode is connected to a water-oxygen separator.

9. The system as claimed in claim 8, wherein the water-hydrogen separator and the water-oxygen separator are connected via a static mixer to a common catalyzer.

10. A system for supplying a generator with hydrogen comprising:
    a closed system cycle for carrying at least one of water and gas; and
    a hydrogen feed line, branching off from the system cycle, for the generator, wherein the system cycle includes an electrolysis unit designed as a membrane electrolyzer, wherein contact layers used as the cathode and contact layers used as the anode are respectively connected on an input side and an output side to a common feed line and to a common discharge line.

11. The system as claimed in claim 10, wherein the feed line on the input side for the cathode includes a non-return valve.

12. The system as claimed in claim 10, wherein the discharge line on the output side of the cathode is connected to a water-hydrogen separator and the discharge line on the output side of the anode is connected to a water-oxygen separator.

13. The system as claimed in claim 12, wherein the water-hydrogen separator and the water-oxygen separator are connected via a static mixer to a common catalyzer.

14. A system for supplying a generator with hydrogen comprising:
    a closed system cycle for carrying at least one of water and gas; and
    a hydrogen feed line, branching off from the system cycle, for the generator, wherein the system cycle includes an electrolysis unit designed as a membrane electrolyzer, wherein the system cycle includes a heat exchanger, arranged downstream of a catalyzer in the direction of flow, and wherein the system cycle includes a feed line for the feeding of water in the section between the catalyzer and the heat exchanger.

15. The system as claimed in claim 14, further comprising:
    a control device, adapted to control an amount of current supplied to the electrolysis unit on the basis of an amount of hydrogen to be prepared by the electrolysis unit,
    a measuring device, adapted to measure an amount of hydrogen fed to the generator and adapted to emit a corresponding signal, and
    a comparison circuit, adapted to compare the measuring signal with a predeterminable setpoint signal and, if they do not match, adapted to correspondingly raise or lower the supply of current to the electrolysis unit.

16. A system for supplying a generator with hydrogen comprising:
    a closed system cycle for carrying at least one of water and gas;
    a hydrogen feed line, branching off from the system cycle, for the generator, wherein the system cycle includes an electrolysis unit designed as a membrane electrolyzer;
    a control device, adapted to control an amount of current supplied to the electrolysis unit on the basis of an amount of hydrogen to be prepared by the electrolysis unit;
    a measuring device, adapted to measure an amount of hydrogen fed to the generator and adapted to emit a corresponding signal; and
    a comparison circuit, adapted to compare the measuring signal with a predeterminable setpoint signal and, if they do not match, adapted to correspondingly raise or lower the supply of current to the electrolysis unit.

17. A system for supplying a generator with hydrogen comprising:
    a closed system cycle for carrying at least one of water and gas; and
    a hydrogen feed line, branching off from the system cycle, for the generator, wherein the system cycle includes an electrolysis unit designed as a membrane electrolyzer, wherein the system is for supplying a generator of a power generating plant with hydrogen.

18. A system for supplying a generator with hydrogen comprising:
- a closed system cycle for carrying at least one of water and gas; and
- a hydrogen feed line, branching off from the system cycle, for the generator, wherein the system cycle includes an electrolysis unit designed as a membrane electrolyzer, wherein the electrolysis unit includes a plurality of membrane electrolysis cells connected electrically in series, and wherein contact layers used as the cathode and contact layers used as the anode are respectively connected on an input side and an output side to a common feed line and to a common discharge line.

19. The system as claimed in claim 18, wherein the feed line on the input side for the cathode includes a non-return valve.

* * * * *